United States Patent
Hudgin

(12) 
(10) Patent No.: US 6,274,033 B1
(45) Date of Patent: Aug. 14, 2001

(54) SEPTIC TANK SLUDGE GAUGE

(76) Inventor: Glen Hudgin, 33 Keller Drive, Suite 201, Belleville, Ontario (CA), K8P 4B3

( * ) Notice: Subject to any disclaimer, the term of this patent is extended or adjusted under 35 U.S.C. 154(b) by 0 days.

(21) Appl. No.: 09/472,030

(22) Filed: Dec. 27, 1999

(51) Int. Cl.[7] .................................................. B01D 35/00
(52) U.S. Cl. ..................... 210/86; 210/532.2; 116/215; 73/290 R
(58) Field of Search ..................... 210/86, 91, 532.2; 116/227, 228, 109, 215; 73/319, 322, 320, 321, 305, 290 R

(56) References Cited

U.S. PATENT DOCUMENTS

| | | |
|---|---|---|
| 1,162,916 | * 12/1915 | Harrison . |
| 1,257,693 | * 2/1918 | Furman . |
| 1,557,568 | * 10/1925 | Dilley . |
| 2,497,694 | * 2/1950 | Shakin . |
| 3,638,493 | * 2/1972 | Schoepflin . |
| 4,715,966 | 12/1987 | Bowman . |
| 5,406,838 | * 4/1995 | Miller . |

* cited by examiner

Primary Examiner—Joseph W. Drodge
Assistant Examiner—Terry K. Cecil
(74) Attorney, Agent, or Firm—Gowling Lafleur Henderson LLP

(57) ABSTRACT

A sludge gauge for measuring the depth of a sludge layer covering a bottom of a septic tank. The sludge gauge has a guide sleeve mountable through a septic tank cover and a probe, at least an upper end of which is slidably received in the guide sleeve. The probe has a base end distal an upper end. The density and base end configuration of the probe are selected to cause the probe to sink through a liquid layer in the septic tank until the base end settles on the sludge layer when the probe is released from a raised position. A cap is securable over an upper end of the guide sleeve and a collapsible connector extends between the cap and the probe for raising the probe into the raised position. An indicator is attached to the cap for indicating a height of the base end of the probe above the bottom of the septic tank thereby indicating sludge depth in the tank.

16 Claims, 2 Drawing Sheets

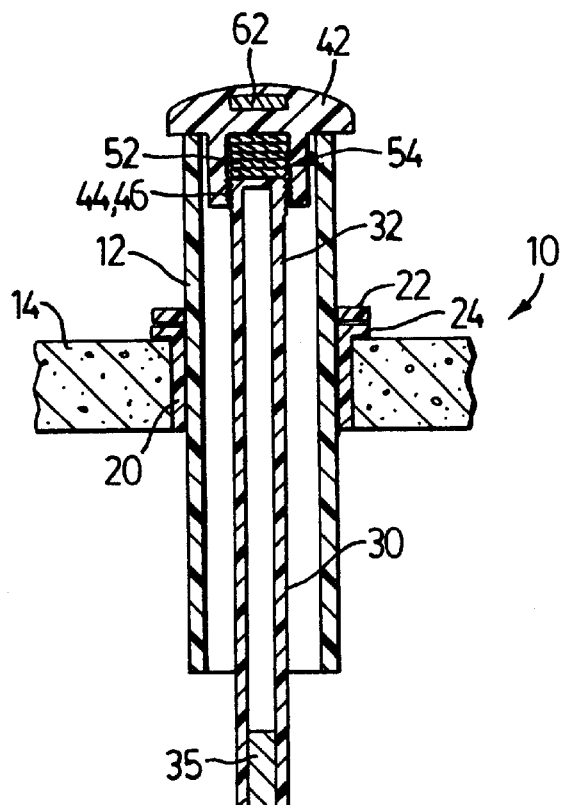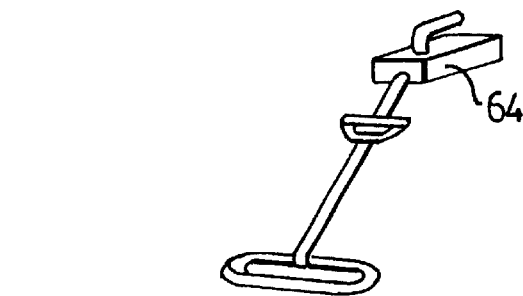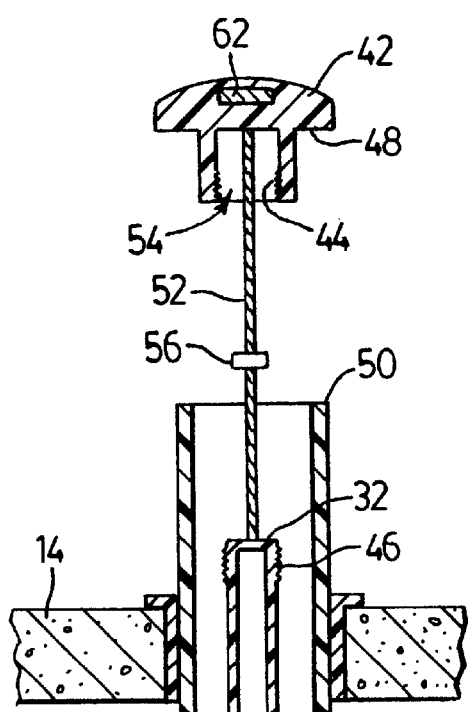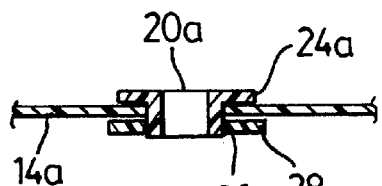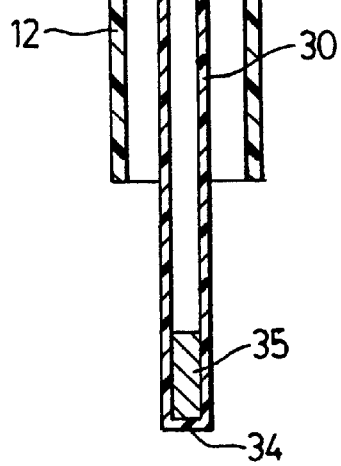
FIG. 1
FIG. 3
FIG. 2

SEPTIC TANK SLUDGE GAUGE

FIELD OF THE INVENTION

This invention relates generally to septic tank systems and more specifically to the determination of sludge depth within such systems.

BACKGROUND OF THE INVENTION

The most typical private sewage disposal system is the septic tank system. The typical septic tank system consists of a leaching bed also called a tile field connected to a concrete septic tank connected to the waste outlet pipe of a building.

The tile bed consists of a series of perforated pipes laid on a bed of stone or gravel in trenches and covered by earth. This series of perforated pipes are connected to an unperforated pipe called the header. The header is connected by pipe to the outlet side of the septic tank.

The septic tank is most commonly made of concrete but can also be plastic or fibreglass. Some older septic tanks are made of steel and very old ones are cribs made of wood. The typical current standard septic tank is a two compartment concrete tank with inlet and outlet baffles on the inside of the tank. These tanks also have concrete manhole access lids ("covers"). The septic tank is installed in the ground and is covered by eighteen inches to two feet or more of earth. The outlet side of the septic tank is connected to the header pipe of the tile field and the inlet side of the septic tank is connected to the plumbing waste pipe of a building.

The septic tank system is more than just a waste disposal system. It is also a waste treatment system and when properly installed and maintained it is a very effective treatment system.

The waste that is disposed of in a septic tank system contains dangerous bacteria, viruses, parasites and substances such as detergents, soaps, greases, food particles, cleaners, bleaches, ammonia, polishes, solvents, insect sprays, various body fluids, faeces, urine, and other offensive or putrescible substances. The waste requires careful disposal in order to protect human health and the natural environment. The microorganisms in the waste such as bacteria, viruses and parasites can cause serious illnesses in humans and therefore if allowed to escape untreated can pose a serious public health threat. Some of these same microorganisms can also cause illness in animals such as livestock. Inadequately treated sewage should not be allowed to pond on the surface of the ground, to flow into open ditches, to back up into basements or foundation drainage systems, to drain directly or indirectly into streams, lakes or other bodies of water or to contaminate ground water aquifers.

Most municipalities in North America have legislation and associated programs in place to monitor and approve the installation of private sewage disposal systems. However, once installed the ongoing maintenance of the private sewage disposal system is usually left up to the individual owner. In the province of Ontario alone 20,000 new septic tank systems are installed each year. Ninety percent of farms in Ontario rely on private water supplies and private sewage disposal systems.

Many studies including those carried out in the Great Lakes Basin in connection with RAPs (Remedial Action Plans) and those carried out in Ontario in connection with CURB (Clean Up Rural Beaches) plans have pointed to malfunctioning septic tank systems as a source of at least some of the contamination found in our surface waters.

Contamination of ground water including well water for drinking and for livestock watering also points to malfunctioning septic tank systems as a source.

A 1992–93 CURB Plan in Eastern Ontario determined that malfunctioning septic tank systems contributed from three trillion *Faecal Coliform* bacteria annually for the Trent River to over seven trillion *Faecal Coliform* bacteria annually for the Napannee River.

A properly installed and maintained septic tank system is not a pollution problem but a malfunctioning system can certainly create a significant public health hazard and environmental health hazard.

The first chamber of a septic tank provides treatment of the waste via the action of anaerobic bacteria. The bacteria naturally in the waste breaks down the waste causing solids or sludge to settle to the bottom of the tank and lighter material "the scum" to float on the surface. The size of a septic tank is important as the waste needs to be retained within the tank for at least 24 hours before it passes into the leaching pipes. During the 24 hours of retention time the waste is broken down into sludge, scum and effluent. The effluent which is the liquid between the sludge and the scum layer passes into the second chamber of the tank and from here it trickles out the outlet pipe into the leaching pipes. The baffles in the tank help to prevent the scum from passing through the tank. At this point the effluent is actually quite clear.

The pipes of the leaching bed distributes the effluent throughout the tile field. The effluent escapes through the perforations in the bottom of the pipe into the gravel or stone bed. As the effluent travels through the stone it is further treated by the action of aerobic bacteria. This action assists in destroying the harmful disease causing bacteria and other pathogenic microorganisms. Over time an organic mat actually forms which further improves the treatment efficiency of the system. The effluent continues to travel beyond the gravel bed and through the soil where the remaining microorganisms are filtered out or are acted upon by soil bacteria. This last stage requires about three feet of unsaturated soil to insure that the effluent reaching the ground water table is microbiologically safe.

A problem occurs when the sludge in the tank builds up over time and the scum layer gets thicker until the two meet in the middle. When this happens there is no capacity left to allow the minimum 24 hours of retention time and no room for the clear effluent to be produced. The treatment quality of the tank is greatly diminished and the sludge and the scum start to get into the second chamber and then into the leaching pipes. When this happens these solid particles plug up the leaching pipes and then there is no adequate distribution of the effluent and no proper treatment of the waste in the tile field.

When the tile field gets plugged up the effluent which can get through the soil is not adequately treated and therefore contaminates the ground water. The effluent which can not get through the soil backs up to the surface of the ground. Once on the surface of the ground the highly contaminated effluent finds its way to surface water sources, especially with the assistance of rainfall.

To prevent this problem routine maintenance of the septic tank requires that the septic tank be pumped out when the bottom of the scum layer is within 3 inches of the bottom of the baffle or outlet fitting, or when the surface of the sludge accumulation is within 18 inches of the baffle or outlet fitting. A septic tank could be pumped out on a regular basis such as every two or three years. This method of maintenance may exclude the need to measure the septic tank contents on an annual basis. However the waste of every household is not the same. Some tanks may need to be pumped every year or sooner and some may only need to be pumped every five years. It would certainly be a waste of money to pump a septic tank out when there is no need to. Also there is a need for proper disposal of the contents pumped from the septic tank therefore it is also in the interests of the environment not to create this additional waste material unless it is absolutely necessary.

It is a fairly significant chore for the average private sewage disposal system owner to measure the contents of their septic tank and certainly so on a regular basis. Probably the thought of carrying out the task only to find that pumping is not needed at that time would be a reason many people may not go to the trouble.

The steps involved in determining the need for pumping are difficult and unpleasant. The usual steps entail:

- determining exactly where the septic tank is buried in the ground (usually requires probing with a steel rod);
- once the tank itself is located, determining the orientation of the tank in order to find the correct access cover (may also require probing with a steel rod, being careful not to damage the inlet or outlet pipes);
- removing overlying sod with as little disturbance as possible and then the soil over the proper location (usually has to be done manually with a spade shovel);
- removing the concrete cover without injury to one's back (concrete manhole covers usually weight about 75 pounds and fit quite tight especially after being buried in the ground for a few years);
- reaching into the septic tank with a yard stick or similar measuring device to measure the amount of sludge and scum; and,
- if the tank does need to be pumped, temporarily covering the hole for safety reasons while awaiting arrival of a septic tank pumper.

It is for these reasons that most private owners are not motivated to carry out routine inspections of their septic tanks and to have the tanks pumped out when the time is due.

Unfortunately most people are not aware of the consequences of not inspecting and pumping their septic tanks and they are not aware until it is too late that corrective action for a malfunctioning system is usually a very costly replacement of the entire tile field not to mention the cost of the damage to the environment and maybe even their own health if it is their drinking water supply that becomes contaminated.

SUMMARY OF THE INVENTION

A sludge gauge for measuring the depth of a sludge layer covering a bottom of a septic tank. The sludge gauge has a guide sleeve mountable through a septic tank cover and a probe, at least an upper end of which is slidably received in the guide sleeve. The probe has a base end distal the upper end. The density and base end configuration of the probe are selected to cause the probe to sink through a liquid layer in the septic tank until the base end settles on the sludge layer when the probe is released from a raised position. A cap is securable over an upper end of the guide sleeve and a collapsible connector extends between the cap and the probe for raising the probe into the raised position. An indicator is attached to the cap for indicating a height of the base end of the probe above the bottom of the septic tank thereby indicating sludge depth in the tank.

Preferably, the sludge gauge includes a releasable retainer acting between the probe and the sleeve for maintaining the probe in the raised position. The releasable retainer may comprise cooperating threads on the upper end of the probe and the cap.

The indicator may be tags or markings on the connector.

The cap may be provided with a metallic component to render it detectable with a metal detector.

DESCRIPTION OF THE DRAWINGS

The preferred embodiments of the present invention are described below with reference to the accompanying drawings in which:

FIG. 1 is an axial section through a sludge gauge according to the present invention in its raised position;

FIG. 2 is a view corresponding to FIG. 1, but illustrating the sludge gauge in its released position;

FIG. 3 is an axial section through a mounting sleeve for use in association with a sludge gauge according to the present invention; and, FIG. 4 is a cross-section through a typical septic tank showing the installation and use of a sludge gauge according to the present invention.

DESCRIPTION OF PREFERRED EMBODIMENTS

Figure 4:
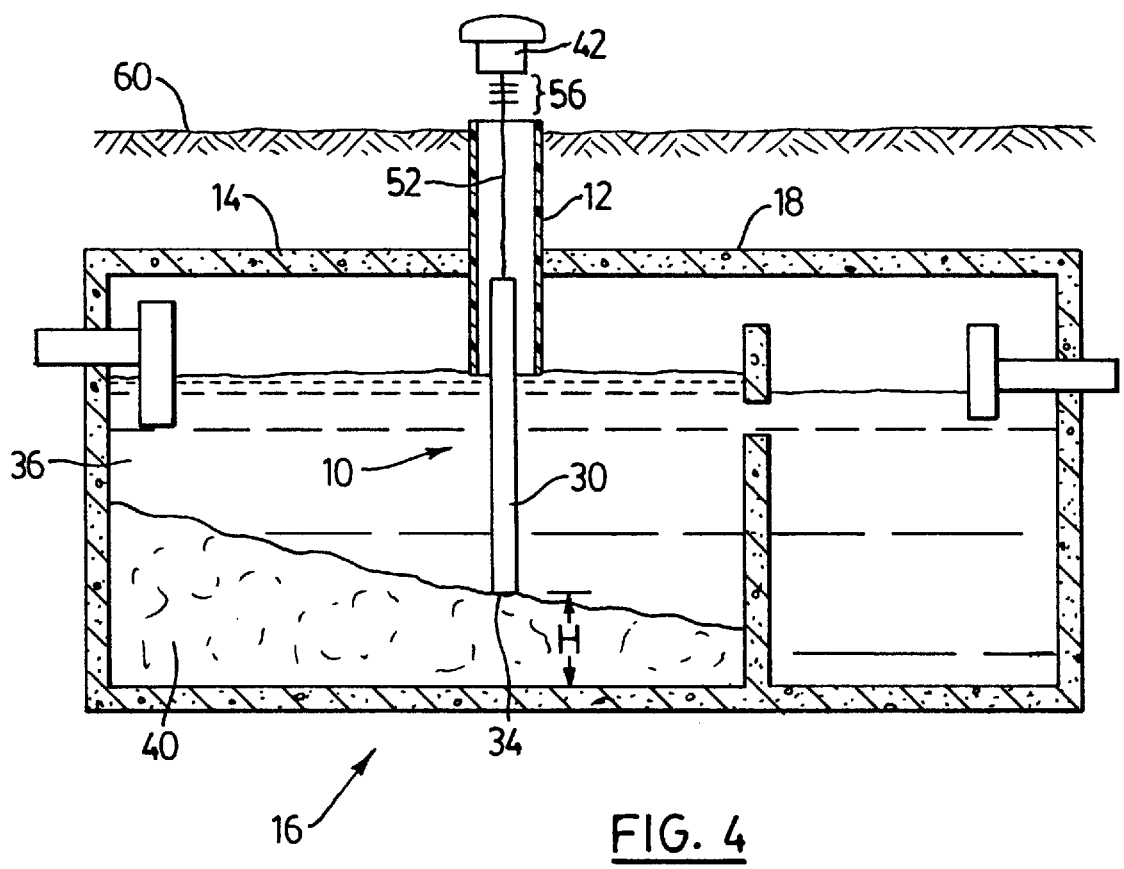

A sludge gauge according to the present invention is generally indicated by reference 10 in the accompanying illustrations. The sludge gauge 10 includes a guide sleeve 12 which is mountable through a cover 14 of a septic tank 16 in FIG. 4. Although the guide sleeve 12 may alternatively be mounted elsewhere through a top 18 of the septic tank 16, it is advantageous to mount it through the cover 14 for at least two reasons.

Firstly, in order to retrofit a sludge gauge 10 according to the present invention on an existing septic tank, it is easier and generally more cost-effective to replace an existing cover with a new cover having a guide sleeve 12 mounted therethrough than to uncover the septic tank top 18 and bore a hole therethrough for installation of the guide sleeve 12. Also, as further described below, the sludge gauge 10 may act as an indicator as to the location of the cover 14 which is useful as the cover 14 will have to be unearthed and removed should pumping be indicated.

The guide sleeve 12 may be directly mounted to the cover 14, or, as illustrated, a mounting sleeve 20 may be cast in the case of a concrete cover 14, into the cover during manufacture for subsequent insertion of the guide sleeve 12. The guide sleeve 12 may be adhesively or otherwise fixed to the mounting sleeve 20, for example a flange 22 may be provided on the guide sleeve 12 for abutting against a top 24 of the mounting sleeve 20.

FIG. 3 illustrates an alternate mounting sleeve 20a which is better suited to fiberglass or plastic septic tanks. The mounting sleeve 20a has a flange 24a and threaded base 26 insertable through a cover 14a and which engages a corresponding nut 28. The mounting sleeve 20a is held in place by the clamping force exerted on the cover 14a between the flange 24a and the nut 28.

A generally cylindrical probe 30 has an upper end 32 slidably received in the guide sleeve 12. The probe 30 has a base end 34 distal the upper end 32. The probe 30 must be capable of sinking through a liquid layer 36 in the septic tank 16 with the base end 34 settling on a sludge layer 40. The density of the probe must therefore be selected to cause sinking but not to such a degree that the base end 34 becomes embedded in the sludge layer 40 as it is the height of the top of the sludge layer 40 which is to be determined. The configuration of the base end 34 will also be a factor in how much probe weight can be supported by the base end 34 without sinking. Obviously a base end of larger surface area will be less inclined to sink into the sludge layer 40 than would a base end 34 of smaller surface area. A weight 35 may be provided at the base end 34 to provide a suitable density.

FIG. 1 illustrates the probe 30 in a raised position in which it would typically be stored when not in use. In the raised position, the probe 30 is retracted within the guide sleeve 12 and releasibly secured in place. Releasable securement may be by way of any suitable means. Illustrated is a cap 42 which has internal threads 44 which engage external threads 46 provided about the upper end 32 of the probe 30. The threads 44 and 46 act as a releasable retainer for securing the probe 30 to the cap 42. The cap 42 further has a lip 48 extending radially outwardly with a diameter sufficient to extend over a top 50 of the guide sleeve 12 to prevent the cap 42 and affixed probe 30 from falling into the guide sleeve 12. The cap 42 therefore in this configuration acts between the probe 30 and guide sleeve 12 as a releasable retainer for maintaining the probe 30 in its raised position.

It will be apparent to one skilled in such structures that there are many alternatives for the releasable retainer for holding the probe 30 in its raised position. For example, a retaining pin may be inserted between the guide sleeve 12 and the upper end 32 of the probe 30; releasable detent means may be provided between the guide sleeve 12 and the probe 30 or between the cap 42 and the upper end 32 of the probe 30; a retaining pin may be provided between the upper end 32 of the probe 30 and the cap 42; or, a guide pin may be provided on one of the upper end 32 of the probe 30 and the cap 42 and a channel for registering with the guide pin on the other of the upper end 32 of the probe 30 and the cap 42. No doubt other suitable releasable retainer arrangements can be devised.

A collapsible connector 52 extends between the cap 42 and the probe 30. The connector 52 may be a chain or a rope for example and preferably of a material which is substantially non-reactive in a septic tank environment which will typically be humid and alkaline. A suitable connector 52 may be made of polypropylene rope. The connector 52 enables the probe 30 to be raised in the guide sleeve from the released position illustrated in FIGS. 2 and 4 to the raised position illustrated in FIG. 1. Collapsibility of the connector 52 enables its storage beneath the cap 42 in a space 54 defined between the cap 42 and the top 32 of the probe 30.

An indicator 56 is provided to indicate the height of the base end 34 of the probe 30 above a bottom 58 of the septic tank 16. The indicator 56 may be a tag or a marking affixed to the connector 52 which may be compared to a reference such as the top 50 of the guide sleeve 12. For example, the indicator 56 in FIG. 2 is above the top 50 which could indicate that a height H of the sludge 40 is such that pumping is indicated.

The indicator 56 may be separate from the connector, for example, a weighted string hanging down from the cap 42. For simplicity and to minimize the number of components however it is preferred to put the indicator 56 on the connector 52.

The sludge gauge 10 is generally installed with the cap 42 at the ground surface, indicated by reference 60 in FIG. 1. With time, the cap 42 may become covered with earth or overgrown. Accordingly, it is beneficial to provide a cap 42 detectable with a metal detector. Although a metal cap could be used, the metal would have to be capable of surviving underground for extended periods (on the order of years). Alternatively, the cap may be of a plastic or other non-metallic material with a metal object, such as a metallic disc 62 in FIGS. 2 and 3 encapsulated therein. This would serve to make the cap detectable with a metal detector 64 to indicate the location of the cap 42 and, if the sludge gauge is mounted through the cover 14, also indicate the location of the cover 14.

Use of the sludge gauge 10 is quite simple. Once the cap 42 is located and unearthed, the cap 42 is removed from the guide sleeve 12 and the probe 30 released. The probe 30 will sink through the liquid 36 and settle on any sludge 40. The connector 52 is extended to its full length and the position of any markings or other indicator 56 read against a reference, such as the top 50 of the guide sleeve 12. If pumping is indicated, the cover 14 can be unearthed, otherwise the probe 30 may be raised by pulling on the connector 52 to its raised position, the connector 52 collapsed and returned to its storage in the space 54, the cap 42 reattached to the probe 30 and the cap replaced on the guide sleeve 12.

An advantage of the sludge gauge 10 according to the present invention is that all of the components necessary to its use remain together with the septic tank 16. This is an improvement over prior structures, such as for example taught by U.S. Pat. No. 4,715,966 (Bowman) which has a separate probe that must be removed and stored after use. Unlike Bowman, the present invention doesn't require the disagreeable task of removing and storing a sludge covered float assembly. Also, the probe 30 of the present invention can't get lost or misplaced as is the case with the Bowman float. The elimination of the requirement to expose and handle sludge covered components is very significant as it makes the task of checking the sludge level much less detestable and therefore more likely to be carried out.

The components of the present invention may be manufactured from any suitable materials non-reactive with a septic tank environment. Plastics materials, for example ABS and PVC plastics are suitable candidates.

The above description is intended in an illustrative rather than a restrictive sense. Variations to the exact structures described above may be apparent to persons skilled in such structures without departing from the spirit and scope of the present invention as defined by the claims set out below.

I claim:

1. A sludge gauge for measuring the depth of a sludge layer covering a bottom of a septic tank, said sludge gauge comprising:

a guide sleeve for mounting through a septic tank cover;

a probe having an upper end slidably received in said guide sleeve and a base end distal said upper end;

said probe having a density and a configuration of said base end selected to cause said probe to sink through a liquid layer in said septic tank with said base end settling on said sludge layer when said probe is released from a raised position;

a cap securable over an upper end of said guide sleeve;

a collapsible connector extending between said cap and said probe for raising said probe into said raised position; and, an indicator attached to said cap for indicating a height of said base end above said bottom of said septic tank.

2. A sludge gauge as claimed in claim 1 further comprising:

a releasable retainer acting between said probe and said sleeve for maintaining said probe in said raised position.

3. A sludge gauge as claimed in claim 2 wherein:
said releasable retainer connects said upper end of said probe to said cap.

4. A sludge gauge as claimed in claim 3 wherein said releasable retainer includes a threaded portion on said cap which engages a corresponding threaded portion on said upper end of said probe.

5. A sludge gauge as claimed in claim 2 wherein:
said collapsible connector is a member selected from the group consisting of rope and chain which are substantially non-reactive in a septic tank environment.

6. A sludge gauge as claimed in claim 5 wherein:
said collapsible connector is storable in a space defined between said cap and said upper end of said probe when said cap is secured to said probe.

7. A sludge gauge as claimed in claim 5 wherein:
said cap includes a metal component rendering said cap detectable with a metal detector.

8. A sludge gauge as claimed in claim 5 wherein:
said indicator is one of markings and tags on said collapsible connector.

9. A sludge gauge as claimed in claim 6 wherein said indicator is one of markings and tags on said collapsible connector.

10. A sludge gauge as claimed in claim 7 wherein said indicator is one of markings and tags on said collapsible connector.

11. A sludge gauge as claimed in claim 4 wherein:
said guide sleeve is a plastic tube;
said probe is a plastic tube sealed and weighted at said base end;
said cap is of a plastics materials and has a metal disc embedded therein;
said collapsible connector is of polypropylene rope; and,
said indicator is one of markings and tags on said polypropylene rope.

12. A sludge gauge as claimed in claim 9 further including a mounting sleeve for mounting through a septic tank cover, said mounting sleeve slidably receiving said guide sleeve therethrough and said guide sleeve having a flange extending radially therefrom for abutting against a top of said mounting sleeve.

13. A sludge gauge as claimed in claim 10 further including a mounting sleeve for mounting through a septic tank cover, said mounting sleeve slidably receiving said guide sleeve therethrough and said guide sleeve having a flange extending radially therefrom for abutting against a top of said mounting sleeve.

14. A sludge gauge as claimed in claim 11 further including a mounting sleeve for mounting through a septic tank cover, said mounting sleeve slidably receiving said guide sleeve therethrough and said guide sleeve having a flange extending radially therefrom for abutting against a top of said mounting sleeve.

15. A sludge gauge as claimed in claim 3 wherein:
said collapsible connector is a member selected from the group consisting of rope and chain which are substantially non-reactive in a septic tank environment.

16. A sludge gauge as claimed in claim 4 wherein:
said collapsible connector is a member selected from the group consisting of rope and chain which are substantially non-reactive in a septic tank environment.

* * * * *